US010885631B2

(12) United States Patent
Jackson et al.

(10) Patent No.: US 10,885,631 B2
(45) Date of Patent: Jan. 5, 2021

(54) LABEL-FREE CELL SEGMENTATION USING PHASE CONTRAST AND BRIGHTFIELD IMAGING

(71) Applicant: Essen Instruments, Inc., Ann Arbor, MI (US)

(72) Inventors: Timothy R. Jackson, Ann Arbor, MI (US); Nevine Holtz, Ann Arbor, MI (US)

(73) Assignee: Essen Instruments, Inc., Ann Arbor, MI (US)

( * ) Notice: Subject to any disclaimer, the term of this patent is extended or adjusted under 35 U.S.C. 154(b) by 216 days.

(21) Appl. No.: 16/265,910

(22) Filed: Feb. 1, 2019

(65) Prior Publication Data

US 2020/0250822 A1     Aug. 6, 2020

(51) Int. Cl.
  *G06T 7/00*     (2017.01)
  *G06T 7/187*    (2017.01)
  (Continued)

(52) U.S. Cl.
  CPC ....... *G06T 7/0014* (2013.01); *G01N 21/6486* (2013.01); *G06K 9/0014* (2013.01);
  (Continued)

(58) Field of Classification Search
  CPC ....... G06T 7/0014; G06T 7/187; G06T 7/136; G06T 7/11; G06T 7/174; G06T 7/0012;
  (Continued)

(56) References Cited

U.S. PATENT DOCUMENTS 5,162,990 A * 11/1992 Odeyale ............. G01N 15/1468
                                              250/559.07
8,744,164 B2    6/2014 Ozinsky et al.
(Continued)

FOREIGN PATENT DOCUMENTS

CN    201280063329 A    12/2012

OTHER PUBLICATIONS

Flight et al., "Automated noninvasive epithelial cell counting in phase contrast microscopy images with automated parameter selection", Journal of Microscopy, vol. 271, Issue 3 2018, pp. 345-354 (Year: 2018).*

(Continued)

*Primary Examiner* — Nay A Maung
*Assistant Examiner* — Jose M Torres
(74) *Attorney, Agent, or Firm* — McDonnell Boehnen Hulbert & Berghoff LLP

(57) ABSTRACT

The disclosure provides example methods that include a processor: (a) generating at least one phase contrast image of a biological specimen comprising one or more cells centered around a focal plane for the biological specimen; (b) generating a confluence mask in the form of a binary image based on the at least one phase contrast image; (c) receiving a first brightfield image of the biological specimen at a defocusing distance above the focal plane and a second brightfield image of the biological specimen at the defocusing distance below the focal plane; (d) generating a cell image of the biological specimen based on the first and second brightfield image; (e) generating a seed mask based on the cell image and the phase contrast image; and (f) generating an image of the biological specimen showing a cell-by-cell segmentation mask based on the seed mask and the confluence mask.

21 Claims, 8 Drawing Sheets

(51) Int. Cl.
| | |
|---|---|
| *G06T 7/136* | (2017.01) |
| *G06T 7/11* | (2017.01) |
| *G01N 21/64* | (2006.01) |
| *G06K 9/00* | (2006.01) |

(52) U.S. Cl.
CPC ............ *G06K 9/00147* (2013.01); *G06T 7/11* (2017.01); *G06T 7/136* (2017.01); *G06T 7/187* (2017.01); *G06T 2207/10056* (2013.01); *G06T 2207/10064* (2013.01); *G06T 2207/30024* (2013.01)

(58) Field of Classification Search
CPC . G06T 2207/10056; G06T 2207/10064; G06T 2207/30024; G06T 2207/30242; G06T 2207/20156; G06T 2207/3072; G01N 21/6486; G06K 9/0014; G06K 9/00147
See application file for complete search history.

(56) References Cited

U.S. PATENT DOCUMENTS

| | | | |
|---|---|---|---|
| 9,619,881 | B2 | 4/2017 | Maddah et al. |
| 2006/0257013 | A1* | 11/2006 | Ramm ............... G06K 9/00127 382/133 |
| 2009/0086314 | A1* | 4/2009 | Namba ................. G02B 21/34 359/383 |
| 2010/0158805 | A1* | 6/2010 | Cohen ................ A61K 49/0067 424/9.1 |
| 2011/0134233 | A1* | 6/2011 | Alexandrov ......... G02B 21/367 348/79 |
| 2011/0254943 | A1 | 10/2011 | Ozinsky et al. |
| 2013/0243302 | A1* | 9/2013 | Liu ........................... G06T 7/33 382/133 |
| 2014/0300723 | A1* | 10/2014 | Oshima .................. G06T 7/571 348/79 |
| 2017/0108686 | A1* | 4/2017 | Chan ..................... G02B 21/16 |
| 2017/0116715 | A1* | 4/2017 | Takayama .............. G06T 5/008 |
| 2018/0322632 | A1* | 11/2018 | Barnes ..................... G06T 7/11 |
| 2019/0180420 | A1* | 6/2019 | Gutierrez Medina .... G06T 7/10 |

OTHER PUBLICATIONS

Loewke et al., "Automated Cell Segmentation for Quantitative Phase Microscopy," IEEE Transactions on Medical Imaging, vol. 37, Issue 4, pp. 929-940 (Year: 2018).*

Aknoun, S., Savatier, J., Bon, P., Galland, F., Abdeladim, L., Wattellier, B. F., & Monneret, S . (2015) . Living cell dry mass measurement using quantitative phase imaging with quadriwave lateral shearing interferometry: an accuracy and sensitivity discussion. Journal of biomedical optics, 20(12), 126009.

Ronneberger, O., Fischer, P., & Brox, T. (2015, Oct.) . U-net: Convolutional networks for biomedical image segmentation. In International Conference on Medical image computing and computer-assisted intervention (pp. 234-241) . Springer, Cham.

Maiden,, A. M., Humphry, M. J., Zhang, F., & Rodenburg, J. M. (2011) . Superresolution imaging via ptychography. JOSA A, 28(4), 604-612.

Molder, A., Sebesta, M., Gustafsson, M., Gisselson, L., Wingren, A. G., & Alm, K. (2008). Non-invasive, label-free cell counting and quantitative analysis of adherent cells using digital holography . Journal of microscopy, 232(2), 240-247.

Carpenter, A. E., Jones, T. R., Lamprecht, M. R., Clarke, C., Kang, I . H., Friman, O., . . . & Golland, P. (2006). CellProfiler: image analysis software for identifying and quantifying cell phenotypes . Genome biology, 7(10) , R100.

Schindelin, J ., Arganda-Carreras, I., Frise, E., Kaynig, V., Longair, M., Pietzsch, T., . . . & Tinevez, J. Y. (2012). Fiji: an open-source platform for biological-image analysis. Nature methods, 9(7), 676.

Selinummi, J., Ruusuvuori, P., Podolsky, I., Ozinsky, A., Gold, E., Yli-Harja, O., . . . & Shmulevich, I. (2009). Bright field microscopy as an alternative to whole cell fluorescence in automated analysis of macrophage images. PloS one, 4(10), e7497.

Drey, L. L., Graber, M. C., & Bieschke, J. (2013). Counting unstained, confluent cells by modified bright-field microscopy. Biotechniques, 55(1), 28-33.

The International Search Report for International Application No. PCT/US2020/015216; dated Apr. 24, 2020, pp. 1-5.

Ali et al., "Automatic segmentation of adherent biological cell boundaries and nuclei from brightfield microscopy images," Machine Vision and Applications, 23(4):607-21 (May 2011).

Dehlinger et al., "Dye free automated cell counting and analysis," Biotechnology and Bioengineering, 110(3):838-47 (Mar. 2013).

Jaccard et al., "Automated method for the rapid and precise estimation of adherent cell culture characteristics from phase contrast microscopy images: Automated Method for Adherent Culture Monitoring," Biotechnology and Bioengineering, 111(3):504-17 (Mar. 2014).

* cited by examiner

300

305
Generating, via a processor, at least one phase contrast image of a biological specimen comprising one or more cells based on at least one bright field image centered around a focal plane for the biological specimen

310
Generating, via the processor, a confluence mask in the form of a binary image based on the at least one phase contrast image

315
Receiving, via the processor, a first brightfield image of one or more cells in the biological specimen at a defocusing distance above the focal plane and a second brightfield image of the one or more cells in the biological specimen at the defocusing distance below the focal plane

320
Generating, via the processor, a cell image of the one or more cells in the biological specimen based on the first brightfield image and the second brightfield image

325
Generating, via the processor, a seed mask based on the cell image and the at least one phase contrast image

330
Generating, via the processor, an image of the one or more cells in the biological specimen showing a cell-by-cell segmentation mask based on the seed mask and the confluence mask

FIG. 3

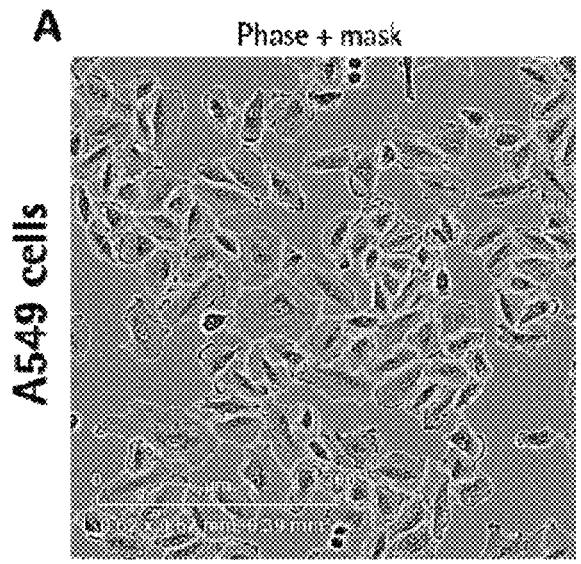
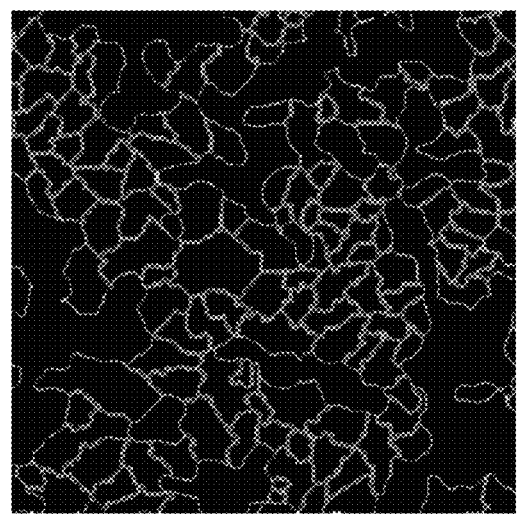
FIG. 7A  FIG. 7B
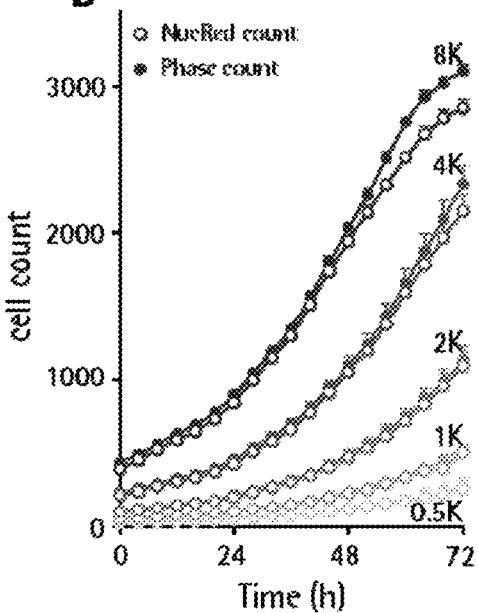
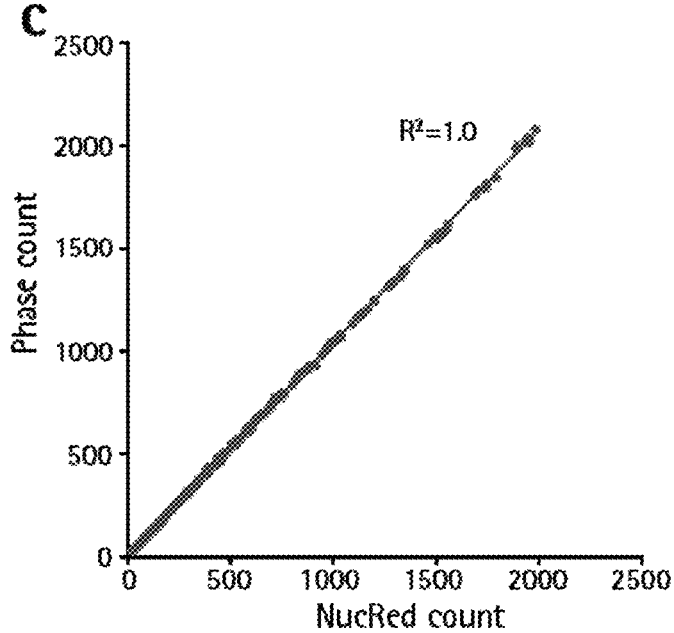
FIG. 7C  FIG. 7D

LABEL-FREE CELL SEGMENTATION USING PHASE CONTRAST AND BRIGHTFIELD IMAGING

BACKGROUND

Current known methods of segmenting cells in biological specimens require fluorescently-labeled proteins, e.g., thresholding a nuclear-localizing protein like histones for a marker-controlled segmentation algorithm. Alternative label-free techniques exist, such as ptychography-based methods, lateral shearing interferometry and digital holography, but these require a complex image acquisition setup and a complicated image formation algorithm with long processing times. Another label-free technique includes deep-learning algorithms (e.g., convolutional neural networks) that require extensive training on large data sets of images and slow processing times. Other methods use a brightfield image in an out-of-focus condition that requires specialized hardware like a pinhole aperture and do not permit cell-by-cell segmentation.

SUMMARY

In one aspect, an example method is disclosed. The method includes (a) generating, via a processor, at least one phase contrast image of a biological specimen comprising one or more cells centered around a focal plane for the biological specimen; (b) generating, via the processor, a confluence mask in the form of a binary image based on the at least one phase contrast image; (c) receiving, via the processor, a first brightfield image of one or more cells in the biological specimen at a defocusing distance above the focal plane and a second brightfield image of the one or more cells in the biological specimen at the defocusing distance below the focal plane; (d) generating, via the processor, a cell image of the one or more cells in the biological specimen based on the first brightfield image and the second brightfield image; (e) generating, via the processor, a seed mask based on the cell image and the at least one phase contrast image; and (f) generating, via the processor, an image of the one or more cells in the biological specimen showing a cell-by-cell segmentation mask based on the seed mask and the confluence mask.

In another aspect, an example non-transitory computer-readable medium is disclosed. The computer readable medium has stored thereon program instructions that upon execution by a processor, cause performance of a set of acts including (a) the processor generating at least one phase contrast image of a biological specimen comprising one or more cells based on at least one brightfield image centered around a focal plane for the biological specimen; (b) the processor generating a confluence mask in the form of a binary image based on the at least one phase contrast image; (c) the processor receiving a first brightfield image of one or more cells in the biological specimen at a defocusing distance above the focal plane and a second brightfield image of the one or more cells in the biological specimen at the defocusing distance below the focal plane; (d) the processor generating a cell image of the one or more cells based on the first brightfield image and the second brightfield image; (e) the processor generating a seed mask based on the cell image and the at least one phase contrast image; and (f) the processor generating an image of the one or more cells in the biological specimen showing a cell-by-cell segmentation mask based on the seed mask and the confluence mask.

The features, functions, and advantages that have been discussed can be achieved independently in various examples or may be combined in yet other examples further details of which can be seen with reference to the following description and drawings.

BRIEF DESCRIPTION OF THE DRAWINGS

FIG. 3 shows a flowchart of a method, according to an example implementation;

FIG. 7A shows a cell-by-cell segmentation mask imposed over a phase contrast image for label-free cell counting of adherent cells using cell-by-cell segmentation analysis, generated according to an example implementation. Various densities of A549 Cells labelled with NucLight Red reagent were analyzed with both the label-free cell-by-cell analysis and with the red nuclear count analysis to validate the label-free counting over time;

FIG. 7B shows the cell-by-cell segmentation mask according to FIG. 7A without the phase contrast image in the background;

FIG. 7C shows a time course of phase count and NucRed count data across densities, according to the implementation of FIG. 7A; and FIG. 7D shows a correlation of count data over 48 hours and demonstrates R2 value of 1 with a slope of 1, according to the implementation of FIG. 7A.

Figure 1:
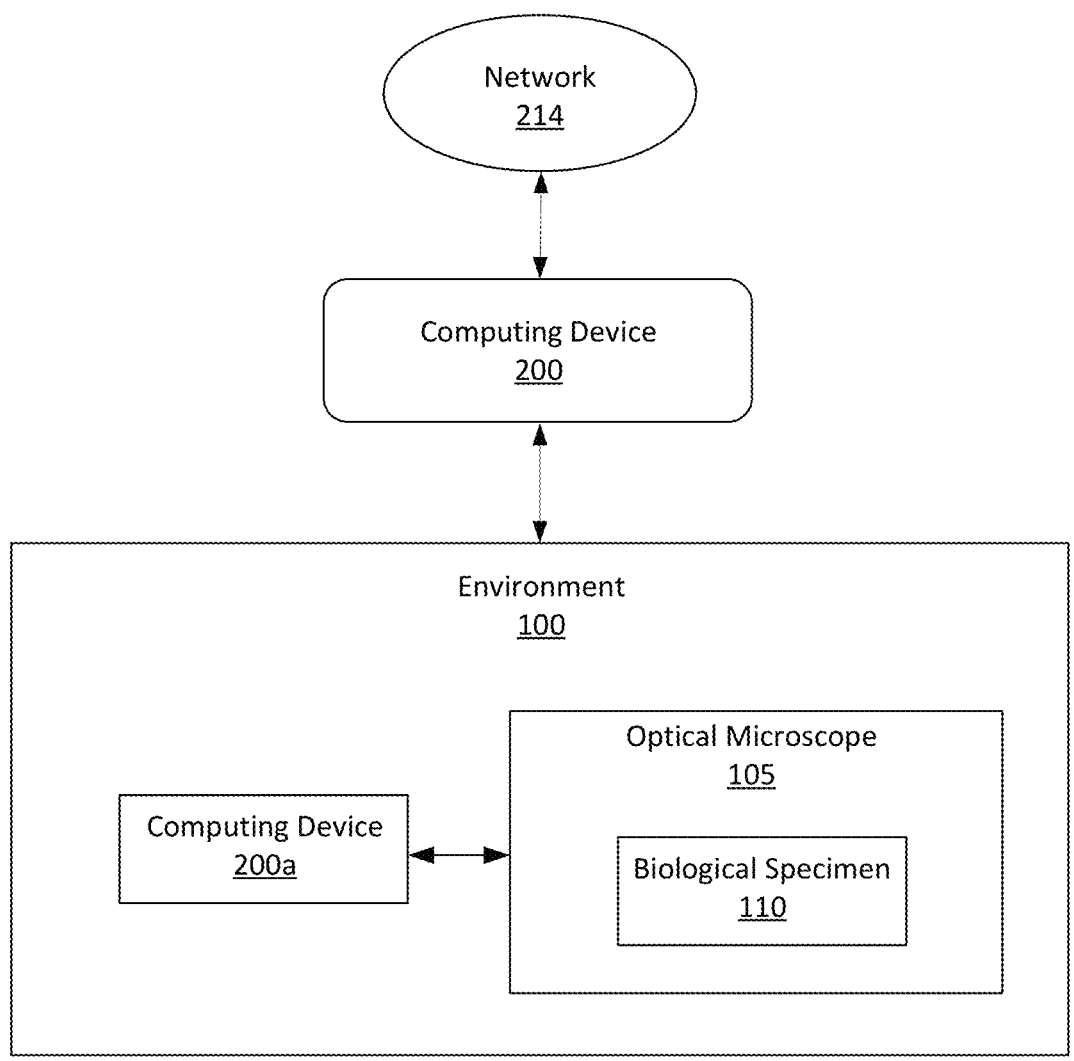
FIG. 1 is a functional block diagram of a system, according to one example implementation.

The drawings are for the purpose of illustrating examples, but it is understood that the inventions are not limited to the arrangements and instrumentalities shown in the drawings.

DETAILED DESCRIPTION

I. Overview

Embodiments of the methods described herein can be used to segment phase contrast images of one or more cells of a biological specimen utilizing out-of-focus brightfield images to thereby permit individual cell and sub-population analysis with fast processing times. The disclosed example methods also beneficially enable a real-time label-free (i.e., fluorescence-free) count of cells and avoid effects of fluorescent marker that can compromise viability and functionality of living cells. A further advantage of the disclosed example methods is detection of individual cell boundaries regardless of the complexities of cell morphology, including flat cells like HUVECs.

II. Example Architecture

FIG. 1 is a block diagram showing an operating environment 100 that includes or involves, for example, an optical microscope 105 and a biological specimen 110 having one or more cells. Method 300 in FIGS. 3-5 described below shows an embodiment of a method that can be implemented within this operating environment 100.

Figure 2:
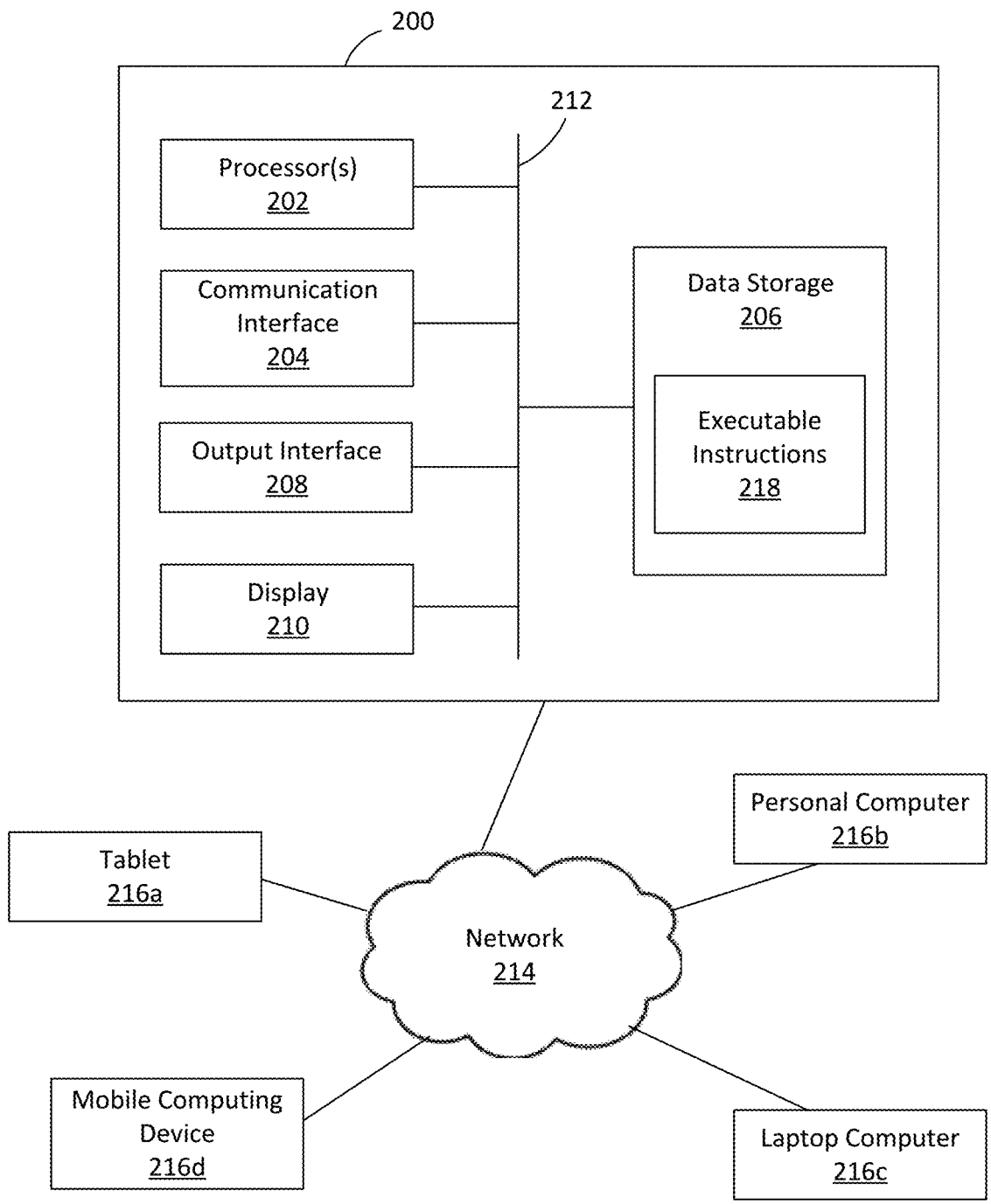
FIG. 2 depicts a block diagram of a computing device and a computer network, according to an example implementation.

FIG. 2 is a block diagram illustrating an example of a computing device 200, according to an example implementation, that is configured to interface with operating environment 100, either directly or indirectly. The computing device 200 may be used to perform functions of methods shown in FIGS. 3-5 and described below. In particular, computing device 200 can be configured to perform one or more functions, including image generating functions that are based, in part, on images obtained by the optical microscope 105, for example. The computing device 200 has a processor(s) 202, and also a communication interface 204, data storage 206, an output interface 208, and a display 210 each connected to a communication bus 212. The computing device 200 may also include hardware to enable communication within the computing device 200 and between computing device 200 and other devices (e.g. not shown). The hardware may include transmitters, receivers, and antennas, for example.

The communication interface 204 may be a wireless interface and/or one or more wired interfaces that allow for both short-range communication and long-range communication to one or more networks 214 or to one or more remote computing devices 216 (e.g., a tablet 216a, a personal computer 216b, a laptop computer 216c and a mobile computing device 216d, for example). Such wireless interfaces may provide for communication under one or more wireless communication protocols, such as Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wired interfaces may include Ethernet interface, a Universal Serial Bus (USB) interface, or similar interface to communicate via a wire, a twisted pair of wires, a coaxial cable, an optical link, a fiber-optic link, or other physical connection to a wired network. Thus, the communication interface 204 may be configured to receive input data from one or more devices, and may also be configured to send output data to other devices.

The communication interface 204 may also include a user-input device, such as a keyboard, a keypad, a touch screen, a touch pad, a computer mouse, a track ball and/or other similar devices, for example.

The data storage 206 may include or take the form of one or more computer-readable storage media that can be read or accessed by the processor(s) 202. The computer-readable storage media can include volatile and/or non-volatile storage components, such as optical, magnetic, organic or other memory or disc storage, which can be integrated in whole or in part with the processor(s) 202. The data storage 206 is considered non-transitory computer readable media. In some examples, the data storage 206 can be implemented using a single physical device (e.g., one optical, magnetic, organic or other memory or disc storage unit), while in other examples, the data storage 206 can be implemented using two or more physical devices.

The data storage 206 thus is a non-transitory computer readable storage medium, and executable instructions 218 are stored thereon. The instructions 218 include computer executable code. When the instructions 218 are executed by the processor(s) 202, the processor(s) 202 are caused to perform functions. Such functions include, but are not limited to, receiving brightfield images from the optical microscope 100 and generating a phase contrast image, a confluence mask, a cell image, a seed mask, a cell-by-cell segmentation mask and fluorescent images.

The processor(s) 202 may be a general-purpose processor or a special purpose processor (e.g., digital signal processors, application specific integrated circuits, etc.). The processor(s) 202 may receive inputs from the communication interface 204, and process the inputs to generate outputs that are stored in the data storage 206 and output to the display 210. The processor(s) 202 can be configured to execute the executable instructions 218 (e.g., computer-readable program instructions) that are stored in the data storage 206 and are executable to provide the functionality of the computing device 200 described herein.

The output interface 208 outputs information to the display 210 or to other components as well. Thus, the output interface 208 may be similar to the communication interface 204 and can be a wireless interface (e.g., transmitter) or a wired interface as well. The output interface 208 may send commands to one or more controllable devices, for example The computing device 200 shown in FIG. 2 may also be representative of a local computing device 200a in operating environment 100, for example, in communication with optical microscope 105. This local computing device 200a may perform one or more of the steps of the method 300 described below, may receive input from a user and/or may send image data and user input to computing device 200 to perform all or some of the steps of method 300. In addition, in one optional example embodiment, the IncuCyte® platform may be utilized to perform method 300 and includes the combined functionality of computing device 200 and optical microscope 105.

FIG. 3 shows a flowchart of an example method 300 to achieve cell-by-cell segmentation for one or more cells of a biological specimen 110, according to an example implementation. Method 300 shown in FIG. 3 presents an example of a method that could be used with the computing device 200 of FIG. 2, for example. Further, devices or systems may be used or configured to perform logical functions presented in FIG. 3. In some instances, components of the devices and/or systems may be configured to perform the functions such that the components are configured and structured with hardware and/or software to enable such performance. Components of the devices and/or systems may be arranged to be adapted to, capable of, or suited for performing the functions, such as when operated in a specific manner. Method 300 may include one or more operations, functions, or actions as illustrated by one or more of blocks 305-330. Although the blocks are illustrated in a sequential order, some of these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of the present examples. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time such as register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 3, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

III. Example Methods

As used herein, a "brightfield image" refers to an image obtained via a microscope based on a biological sample illuminated from below such that the light waves pass through transparent portions of the biological sample. The varying brightness levels are then captured in a brightfield image.

As used herein, a "phase contrast image" refers to an image obtained via a microscope, either directly or indirectly, based on a biological sample illuminated from below capturing phase shifts of light passing through the biological sample due to differences in the refractive index of different portions of the biological sample. For example, when light waves travel through the biological specimen, the light wave amplitude (i.e., brightness) and phase change in a manner dependent on properties of the biological specimen. As a result, a phase contrast image has brightness intensity values associated with pixels that vary such that denser regions with a high refractive index are rendered darker in the resulting image and thinner regions with a lower refractive index are rendered lighter in the resulting image. Phase contrast images can be generated via a number of techniques, including from a Z-stack of brightfield images.

As used herein, a "Z-stack" or "Z-sweep" of brightfield images refers to a digital image processing method which combines multiple images taken at different focal distances to provide a composite image with a greater depth of field (i.e. the thickness of the plane of focus) than any of the individual source brightfield images.

As used herein, a "focal plane" refers to a plane arranged perpendicular to an axis of an optical microscope's lens at which a biological specimen is observable at optimal focus.

As used herein, a "defocusing distance" refers to a distance above or below the focal plane such that the biological specimen is observable out of focus.

As used herein, a "confluence mask" refers to a binary image in which pixels are identified as belonging to the one or more cells in the biological specimen such that pixels corresponding to the one or more cells are assigned a value of 1 and the remaining pixels corresponding to background are assigned a value of 0 or vice versa.

As used herein, a "cell image" refers to an image generated based on at least two brightfield images obtained at different planes to enhance cell contrast relative to the background.

As used herein, a "seed mask" refers to an image having a binary pixelation generated based on a set pixel intensity threshold.

As used herein, a "cell-by-cell segmentation mask" refers to an image having binary pixelation (i.e., each pixel is assigned a value of 0 or 1 by the processor) such that the cells of the biological specimen 110 are each displayed as a distinct region-of-interest. The cell-by-cell segmentation mask may advantageously permit label-free counting of cells displayed therein, permit determination of the entire area of individual adherent cells, permit analysis based on cell texture metrics and cell shape descriptors, and/or permit detection of individual cell boundaries, including for adherent cells that tend to be formed in sheets, where each cell may contact a number of other adjacent cells in the biological specimen 110.

As used herein, "region-growing iteration" refers to a single step in an iterative image segmentation method by which regions-of-interest ("ROIs") are defined by taking one or more initially identified individual or sets of pixels (i.e., "seeds") and iteratively expanding that seed by adding neighboring pixels to the set. The processor utilizes similarity metrics to determine which pixels are added to the growing region and stopping criteria are defined for the processor to determine when the region growing is complete.

Figure 4:
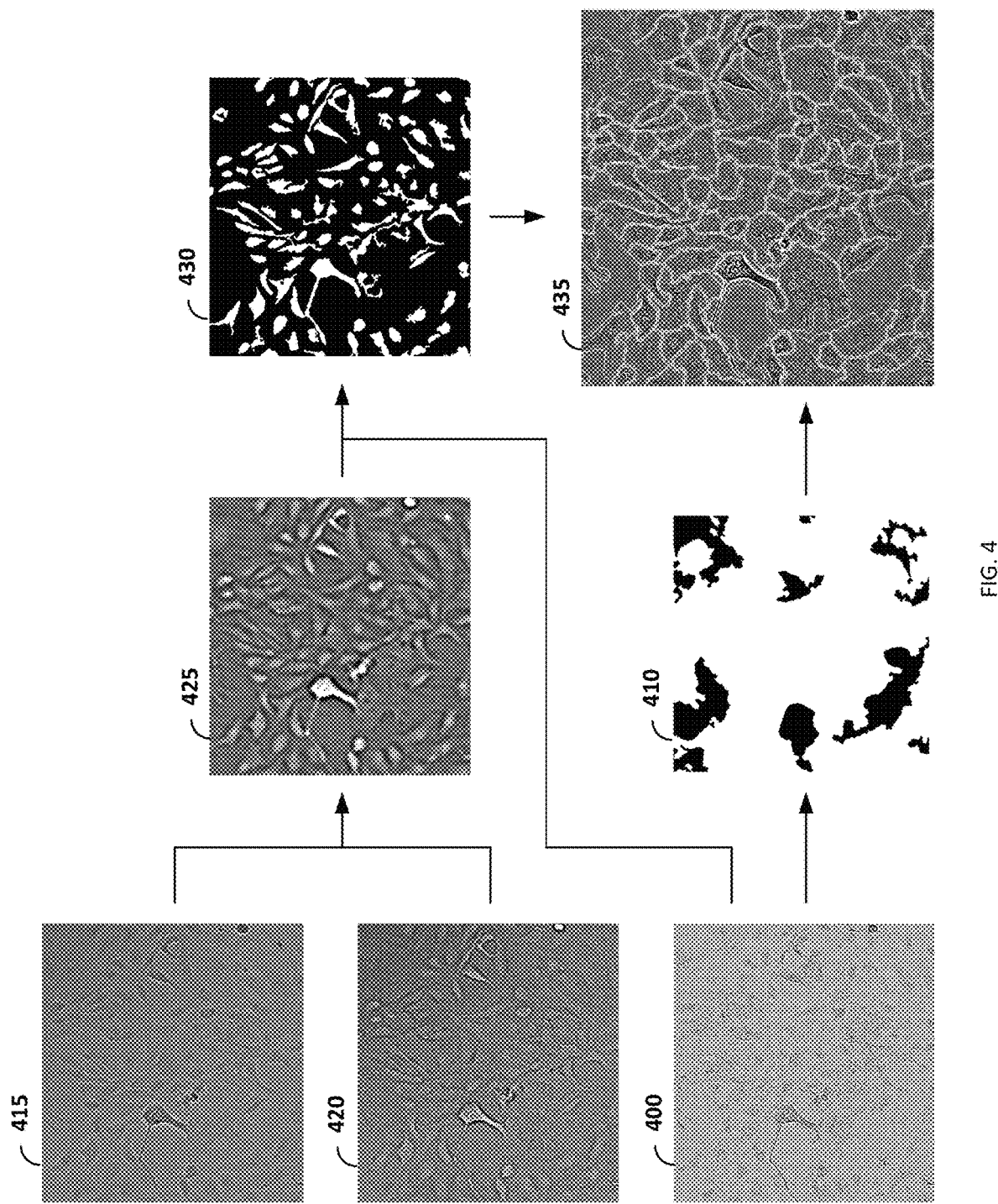
FIG. 4 shows images of a biological specimen, according to an example implementation.
Figure 5:
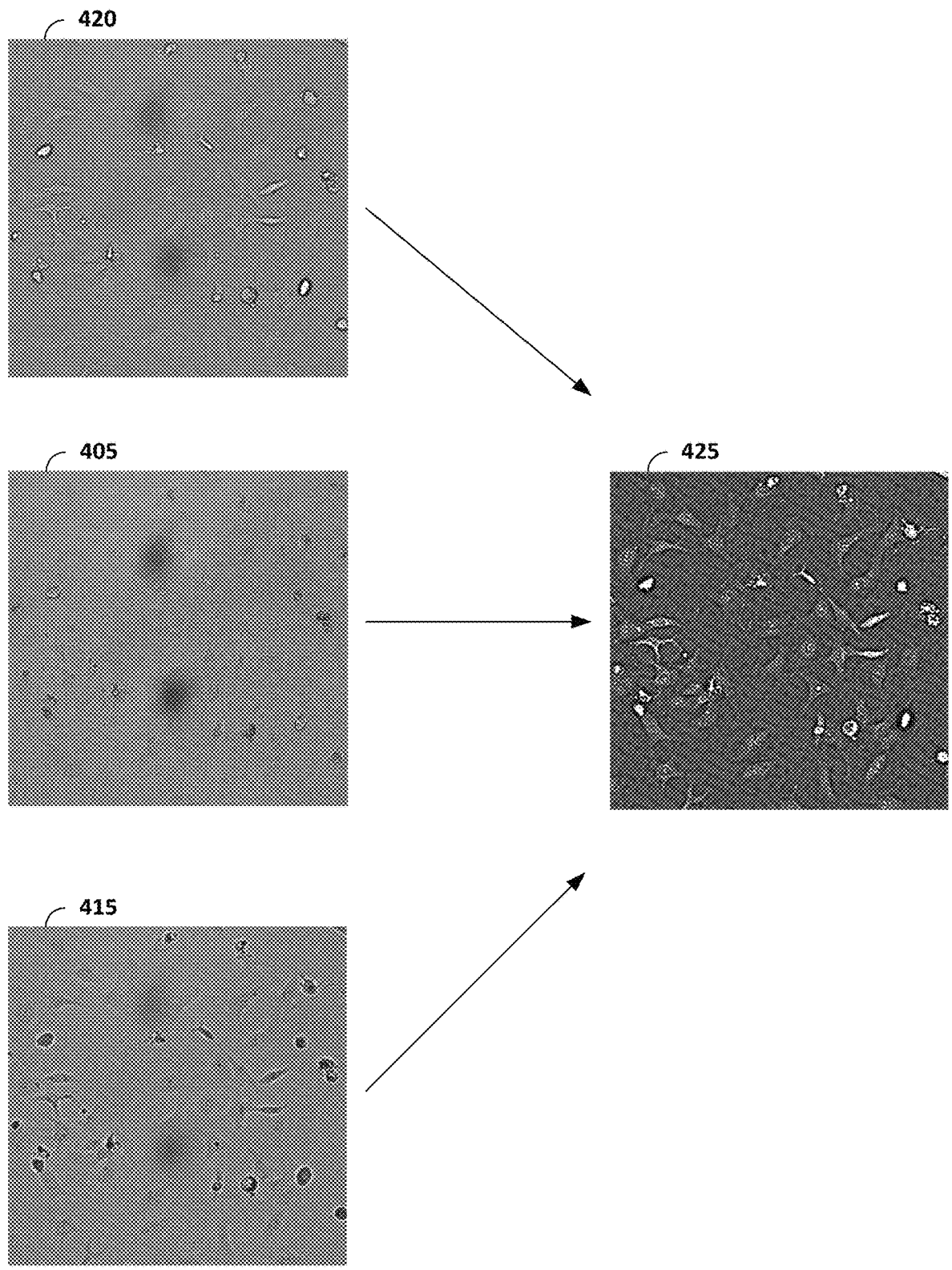
FIG. 5 shows images of another biological specimen, according to an example implementation.

Referring now to FIGS. 3-5, a method 300 is illustrated using the computing device of FIGS. 1-2. Method 300 includes, at block 305, a processor 202 generating at least one phase contrast image 400 of a biological specimen 110 comprising one or more cells centered around a focal plane for the biological specimen 110. Then, at block 310, the processor 202 generates a confluence mask 410 in the form of a binary image based on the at least one phase contrast image 400. Next, at block 315, the processor 202 receives a first brightfield image 415 of one or more cells in the biological specimen 110 at a defocusing distance above the focal plane and a second brightfield image 420 of the one or more cells in the biological specimen 110 at the defocusing distance below the focal plane. The processor 202 then generates a cell image 425 of the one or more cells in the biological specimen based on the first brightfield image 415 and the second brightfield image 420, at block 320. At block 325, the processor 202 generates a seed mask 430 based on the cell image 425 and the at least one phase contrast image 400. And the processor 202 generates an image of the one or more cells in the biological specimen showing a cell-by-cell segmentation mask 435 based on the seed mask 430 and the confluence mask 410, at block 330.

As shown in FIG. 3, at block 305, the processor 202 generating at least one phase contrast image 400 of the biological specimen 110 comprising one or more cells centered around the focal plane for the biological specimen 110 includes the processor 202 both receiving a Z-sweep of brightfield images and then generating the at least one phase contrast image 400 based on the Z-sweep of brightfield images. In various embodiments, the biological specimen 110 may be dispersed within a plurality of wells in a well plate representing an experimental set.

In one optional embodiment, method 100 includes the processor 202 both receiving at least one fluorescent image and then calculating a fluorescent intensity of the one or more cells in the biological specimen 110 within the cell-by-cell segmentation mask 435. In this embodiment, the fluorescent intensity corresponds to the level of a protein of interest, e.g. antibodies that label a cell surface marker like CD20 or an annexin-V reagent that induces fluorescence corresponding to cell death. In addition, determining fluorescent intensity within individual cell boundaries may increase subpopulation identification and permit calculation of subpopulation-specific metrics (e.g., an average area and eccentricity of all dying cells, as defined by the presence of annexin-V).

In another embodiment, at block 310, the processor 202 generating the confluence mask 410 in the form of the binary image based on the at least one phase contrast image 400 includes the processor 202 applying one or more of a local texture filter or a brightness filter to enable identification of pixels belonging to the one or more cells in the biological specimen 110. Example filters can include, but are not limited to local range filters, local entropy filters, local standard deviation filters, local brightness filters and Gabor wavelet filters. Example confluence masks 410, are shown in FIGS. 4 and 5.

In another optional embodiment, the optical microscope 105 determines the focal plane of the biological specimen 110. In addition, in various embodiments, the defocusing distance may range from 20 µm to 60 µm. The optimal defocusing distance is determined based on the optical properties of the objective used, including the magnification and working distance of the objective.

In a further embodiment shown in FIG. 5, at block 320, the processor 202 generating the cell image 425 based on the first brightfield image 415 and the second brightfield image 420 includes the processor 202 enhancing the first brightfield image 415 and the second brightfield image 420 based on a third brightfield image 405 that is centered around the focal plane utilizing at least one of a plurality of pixel-wise mathematical operations or feature detection. One example of a pixel-wise mathematical operation includes addition, subtraction, multiplication, division or any combination of these operations. Then, the processor 202 calculates transform parameters to align the first brightfield image 415 and the second brightfield image 420 with the at least one phase contrast image 400. Next, the processor 202 combines brightness levels for each pixel of the aligned second brightfield image 420 by a brightness level of corresponding pixels in the aligned first brightfield image 415 to thereby form the cell image 425. The combination of brightness levels for each pixel can be achieved via any of the mathematical operations described above. The technical effect of generating the cell image 425 is to remove brightfield artefacts (e.g., shadows) and enhance image contrast to increase cell detection for the seed mask 430.

In another optional embodiment, at block 320, the processor 202 generating the cell image 425 of the one or more cells in the biological specimen 110 based on the first brightfield image 415 and the second brightfield image 420 includes the processor 202 receiving one or more user-defined parameters that determine one or more threshold levels and one or more filter sizes. The processor 202 then applies one or more smoothing filters to the cell image 425 based on the one or more user-defined parameters. The technical effect of the smoothing filters is to further increase accuracy of cell detection in the seed mask 430 and increase the likelihood that one seed will be assigned per cell. Smoothing filter parameters are chosen to adapt to different adherent cell morphologies, for example, flat versus rounded shape, protrusive cells, clustered cells, etc.

In a further optional embodiment, at block 325, the processor 202 generating the seed mask 430 based on the cell image 425 and the at least one phase contrast image 400 includes the processor 202 modifying the cell image 425 such that each pixel at or above a threshold pixel intensity is identified as a cell seed pixel, thereby resulting in the seed mask 430 having a binary pixelation. The technical effect of the seed mask's binary pixelation is to permit comparison with the corresponding binary pixelation of the confluence mask. The seed mask's binary pixelation is also utilized as a starting point for the region-growing iteration discussed below. For example, in yet another optional embodiment, the seed mask 430 may have a plurality of seeds that each correspond to a single cell in the biological specimen 110. In this embodiment, method 300 further includes, prior to the processor 202 generating the image of the one or more cells in the biological specimen showing the cell-by-cell segmentation mask 435, the processor 202 comparing the seed mask 430 and the confluence mask 410 and eliminating one or more regions from the seed mask 430 that are not arranged in an area of the confluence mask 410 and eliminating one or more regions from the confluence mask 410 that do not contain one of the plurality of seeds of the seed mask 430. The technical effect of these eliminated regions is to exclude small bright objects (e.g., cell debris) that generate a seed and to increase identification of seeds utilized in the region-growing iteration described below.

In a further optional embodiment, at block 330, the processor 202 generating the image of the one or more cells in the biological specimen 110 showing the cell-by-cell segmentation mask 435 based on the seed mask 430 and the confluence mask 410 includes the processor 202 performing a region-growing iteration for each of an active set of seeds. The processor 202 then repeats the region-growing iteration for each seed in the active set of seeds until a growing region for a given seed reaches one or more borders of the confluence mask 410 or overlaps with a growing region of another seed. The active set of seeds is selected by the processor 202 for each iteration based on properties of the corresponding pixels' values in the cell image. In addition, the technical effect of using at least one phase contrast image 400, as well as brightfield images 415, 420, 405, is that the seeds correspond to both a bright spot in the cell image 425 and also areas of high texture in the phase contrast image 400 (i.e., overlap of the confluence mask 410 with the seed mask 430 described in more detail below). Another technical effect that results from using the confluence mask 410, the at least one phase contrast image, as well as brightfield images 415, 420, 405, is increased accuracy in the identification of individual cell locations and cell boundaries in the cell-by-cell segmentation mask 435 that advantageously permits quantifying features like cell surface protein expression, as one example.

In still another optional embodiment, method 300 may include the processor 202 applying one or more filters in response to user input to remove objects based on one or more cell texture metrics and cell shape descriptors. The processor 202 then modifies the image of the biological specimen showing the cell-by-cell segmentation mask in response to application of the one or more filters. Example cell texture metrics and cell shape descriptors include, but are not limited to, a cell's size, perimeter, eccentricity, fluorescent intensity, aspect ratio, solidity, Feret's diameter, phase contrast entropy and phase contrast standard deviation.

In a further optional embodiment, the method 300 may include the processor 202 determining a cell count for the biological specimen 110 based on the image of the one or more cells in the biological specimen 110 showing the cell-by-cell segmentation mask 435. The foregoing cell count is advantageously permitted as a result of defined cell boundaries shown in the cell-by-cell segmentation mask 435, shown for example in FIG. 4. In one optional embodiment, the one or more cells in the biological specimen 110 are one or more of adherent cells and non-adherent cells. In a further embodiment, the adherent cells may include one or more of various cancer cell lines, including human lung carcinoma cells, fibrocarcinoma cells, breast cancer cells, ovarian cancer cells, or human microvascular cell lines, including human umbilical vein cells. In an optional embodiment, the processor 202 performs the region-growing iteration in such a way that different smoothing filters are applied to non-adherent cells, including human immune cells like PMBCs and Jurkat cells, than are applied to adherent cells to improve approximation of cell boundaries.

As discussed above, a non-transitory computer-readable medium having stored thereon program instructions that upon execution by a processor 202 may be utilized to cause performance of any of functions of the foregoing methods.

As one example, a non-transitory computer-readable medium having stored thereon program instructions that upon execution by a processor 202, cause performance of a set of acts that include the processor 202 generating at least one phase contrast image 400 of a biological specimen 110 comprising one or more cells based on at least one brightfield image 405 centered around a focal plane for the biological specimen 110. The processor 202 then generates a confluence mask 410 in the form of a binary image based on the at least one phase contrast image 400. Next, the processor 202 receives a first brightfield image 415 of one or more cells in the biological specimen 110 at a defocusing distance above the focal plane and a second brightfield image 420 of the one or more cells in the biological specimen 110 at the defocusing distance below the focal plane. The processor 202 then generates a cell image 425 of the one or more cells based on the first brightfield image 415 and the second brightfield image 420. The processor 202 also generates a seed mask 430 based on the cell image 425 and the at least one phase contrast image 400. And the processor 202 generates an image of the one or more cells in the biological specimen 100 showing a cell-by-cell segmentation mask 435 based on the seed mask 430 and the confluence mask 410.

In one optional embodiment, the non-transitory computer-readable medium further includes the processor 202 receiving at least one fluorescent image and the processor 202 calculating a fluorescent intensity of the one or more cells in the biological specimen within the cell-by-cell segmentation mask.

In another optional embodiment, the non-transitory computer-readable medium further includes the processor 202 generating the seed mask 430 based on the cell image 425 and the at least one phase contrast image 400. And the non-transitory computer-readable medium further includes the processor 202 modifying the cell image 410 such that each pixel at or above a threshold pixel intensity is identified as a cell seed pixel, thereby resulting in the seed mask 430 having a binary pixelation.

In a further optional embodiment, the seed mask 430 has a plurality of seeds that each correspond to a single cell. And the non-transitory computer-readable medium further includes, prior to the processor 202 generating the image of the one or more cells in the biological specimen 110 showing the cell-by-cell segmentation mask 435, the processor 202 comparing the seed mask 430 and the confluence mask 410 and eliminating one or more regions from the seed mask 430 that are not arranged in an area of the confluence mask 410 and eliminating one or more regions from the confluence mask 410 that do not contain one of the plurality of seeds of the seed mask 430.

In yet another optional embodiment, the program instruction causing the processor 202 to generate the image of the one or more cells in the biological specimen 110 showing the cell-by-cell segmentation mask 435 based on the seed mask 430 and the confluence mask 410 includes the processor 202 performing a region-growing iteration for each of an active set of seeds. Then, the non-transitory computer-readable medium further includes the processor 202 repeating the region-growing iteration for each seed in the active set of seeds until a growing region for a given seed reaches one or more borders of the confluence mask 410 or overlaps with a growing region of another seed.

The non-transitory computer-readable medium further includes the processor 202 applying one or more filters in response to user input to remove objects based on one or more cell texture metrics and cell shape descriptors. And the processor 202 modifies the image of the biological specimen 110 showing the cell-by-cell segmentation mask 435 in response to application of the one or more filters.

IV. Experimental Results

Figure 6A:
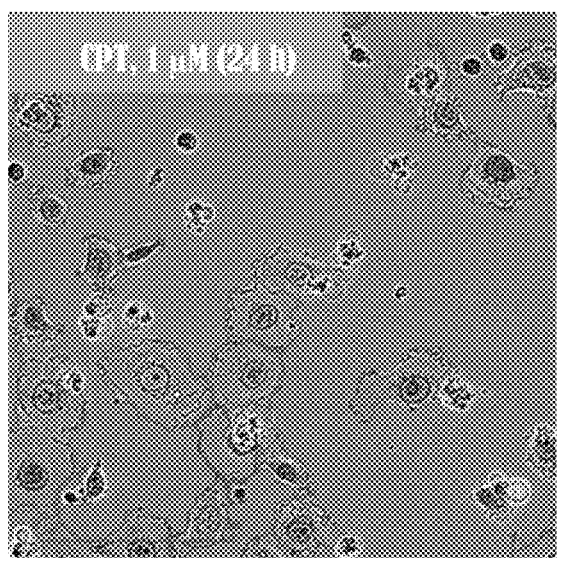
FIG. 6A shows experimental results of a cell-by-cell segmentation mask, generated according to an example implementation, for a cell image response at 24 hours after a time course of HT1080 fibrosarcoma apoptosis following a camptothecin (CPT, cytotoxic) treatment.
Figure 6B:
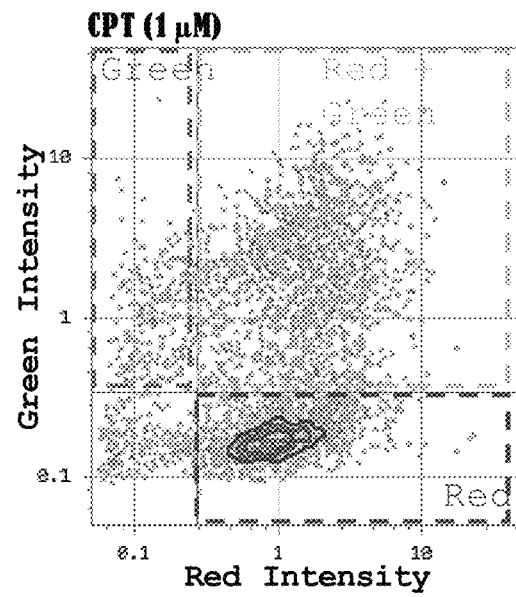
FIG. 6B shows cell subsets classified based on red (Nuclight Red, a cell health indicator, "NucRed") and green fluorescence (Caspase 3/7, an apoptosis indicator), according to the implementation of FIG. 6A.
Figure 6C:
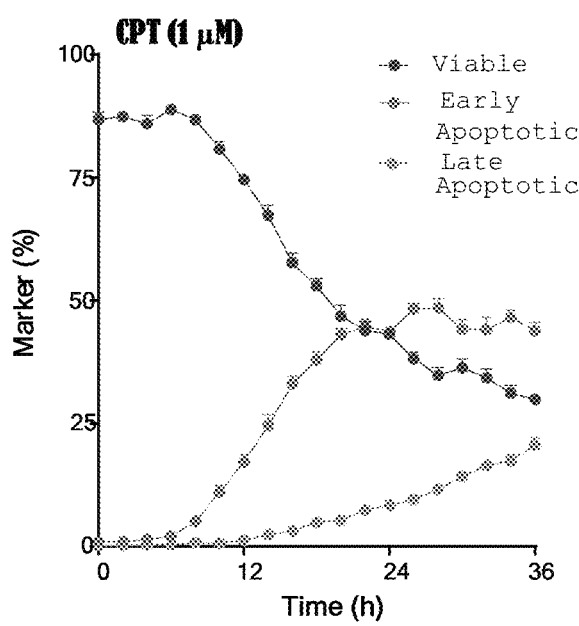
FIG. 6C shows there was a decrease in the red population after CPT treatment indicating loss of viable cells, increasing red and green fluorescence indicating early apoptosis, as well as increasing green fluorescence after 24 hours indicating late apoptosis, according to the implementation of FIG. 6A.
Figure 6D:
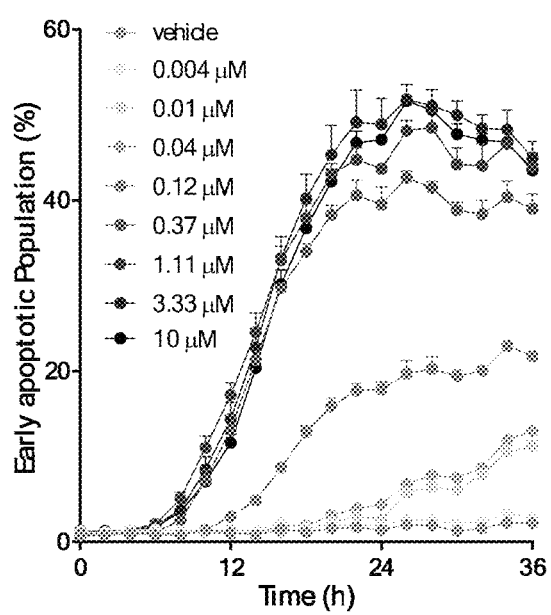
FIG. 6D shows concentration response time courses of the early apoptotic population (percentage of total cells exhibiting red and green fluorescence), according to the implementation of FIG. 6A.

Example implementations permit cell health to be tracked in sub-populations over time. For example, FIG. 6A shows experimental results of a cell-by-cell segmentation mask, generated according to an example implementation, for a phase contrast image response at 24 hours after a time course of HT1080 fibrosarcoma apoptosis following a camptothecin (CPT, cytotoxic) treatment. Cell health was determined with multiplexed readouts of IncuCyte® NucLight Red (nuclear viability marker) and non-perturbing IncuCyte® Caspase 3/7 Green Reagent (apoptotic indicator). FIG. 6B shows cell subsets classified based on red and green fluorescence, according to the implementation of FIG. 6A, using IncuCyte® Cell-by-Cell Analysis Software tools. FIG. 6C shows there was a decrease in the red population after CPT treatment indicating loss of viable cells, increasing red and green fluorescence indicating early apoptosis, as well as increasing green fluorescence after 24 hours indicating late apoptosis, according to the implementation of FIG. 6A. FIG. 6D shows concentration response time courses of the early apoptotic population (percentage of total cells exhibiting red and green fluorescence), according to the implementation of FIG. 6A. Values shown are the mean±SEM of 3 wells.

Figure 6E:
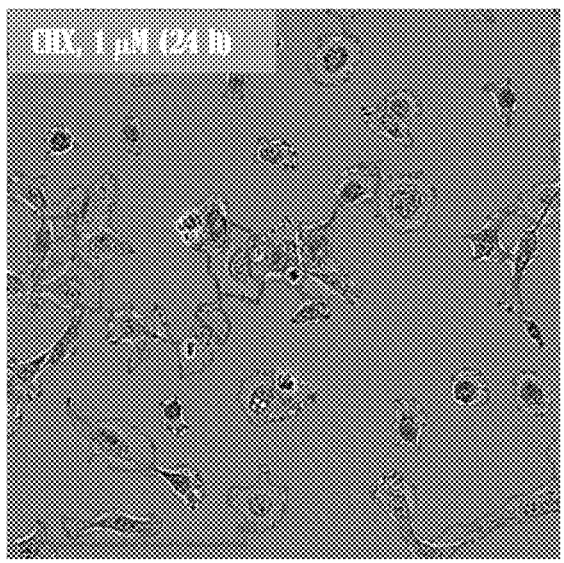
FIG. 6E shows experimental results of a cell-by-cell segmentation mask, generated according to an example implementation, for a cell image response at 24 hours after a time course of HT1080 fibrosarcoma apoptosis following a cyclohexamide (CHX, cytostatic) treatment.
Figure 6F:
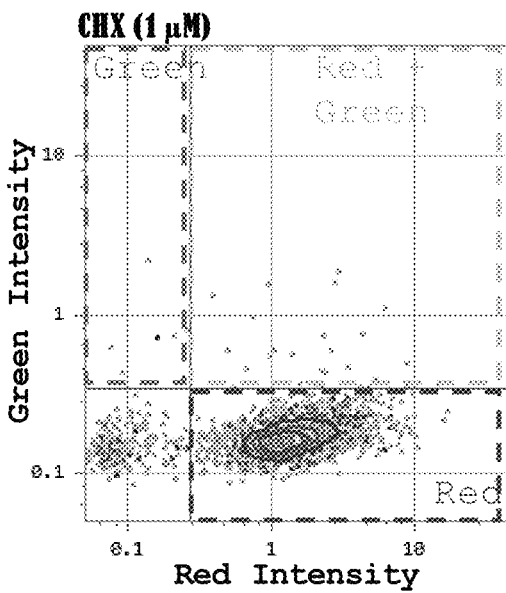
FIG. 6F shows cell subsets classified based on red (Nuclight Red, a cell health indicator, "NucRed") and green fluorescence (Caspase 3/7, an apoptosis indicator), according to the implementation of FIG. 6E.
Figure 6G:
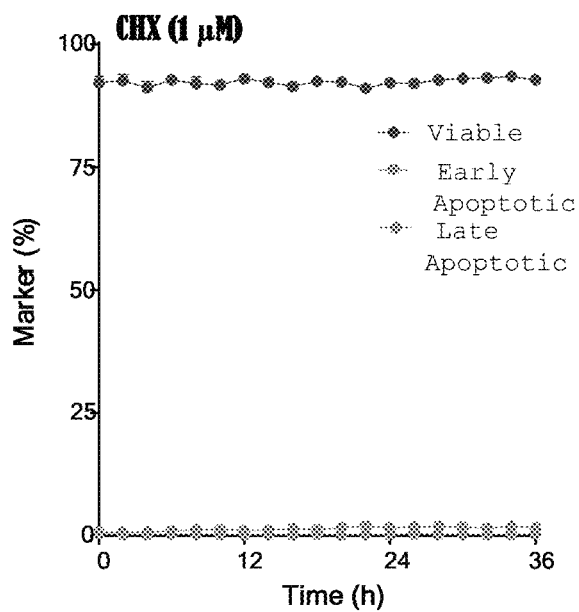
FIG. 6G shows there was a lack of apoptosis but a decrease in cell counts after CHX treatment, according to the implementation of FIG. 6E.
Figure 6H:
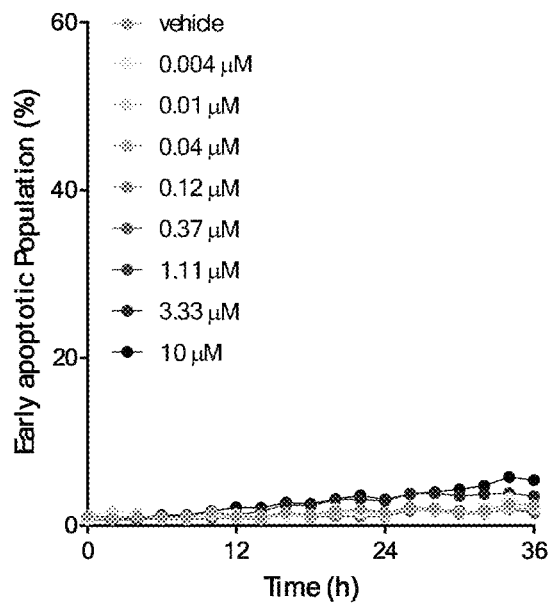
FIG. 6H shows concentration response time courses of the early apoptotic population (percentage of total cells exhibiting red and green fluorescence), according to the implementation of FIG. 6E.

In another example, FIG. 6E shows experimental results of a cell-by-cell segmentation mask, generated according to an example implementation, for a cell image response at 24 hours after a time course of HT1080 fibrosarcoma apoptosis following a cyclohexamide (CHX, cytostatic) treatment. Cell health was determined with multiplexed readouts of IncuCyte® NucLight Red (nuclear viability marker) and non-perturbing IncuCyte® Caspase 3/7 Green Reagent (apoptotic indicator). FIG. 6F shows cell subsets classified based on red and green fluorescence, according to the implementation of FIG. 6E, using IncuCyte® Cell-by-Cell Analysis Software tools. FIG. 6G shows there was a lack of apoptosis but a decrease in cell counts after CHX treatment (data not shown), according to the implementation of FIG. 6E. FIG. 6H shows concentration response time courses of the early apoptotic population (percentage of total cells exhibiting red and green fluorescence), according to the implementation of FIG. 6E. Values shown are the mean±SEM of 3 wells.

FIG. 7A shows a cell-by cell segmentation mask imposed over a phase contrast image for label-free cell counting of adherent cells using cell-by-cell segmentation analysis, generated according to an example implementation via IncuCyte® software. Various densities of A549 Cells labelled with NucLight Red reagent were analyzed with both the label-free cell-by-cell analysis and with the red nuclear count analysis to validate the label-free counting over time. FIG. 7B shows the cell-by-cell segmentation mask according to FIG. 7A without the phase contrast image in the background. FIG. 7C shows a time course of phase count and red count data across densities, according to the implementation of FIG. 7A. FIG. 7D shows a correlation of count data over 48 hours and demonstrates R2 value of 1 with a slope of 1, according to the implementation of FIG. 7A. This has been repeated across a range of cell types. Values shown are the mean±SEM of 4 wells.

The description of different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

We claim:

1. A method, comprising:

generating, via a processor, at least one phase contrast image of a biological specimen comprising one or more cells centered around a focal plane for the biological specimen;

generating, via the processor, a confluence mask in the form of a binary image based on the at least one phase contrast image;

receiving, via the processor, a first brightfield image of one or more cells in the biological specimen at a defocusing distance above the focal plane and a second brightfield image of the one or more cells in the biological specimen at the defocusing distance below the focal plane;

generating, via the processor, a cell image of the one or more cells in the biological specimen based on the first brightfield image and the second brightfield image;

generating, via the processor, a seed mask based on the cell image and the at least one phase contrast image; and generating, via the processor, an image of the one or more cells in the biological specimen showing a cell-by-cell segmentation mask based on the seed mask and the confluence mask.

2. The method of claim 1, wherein generating, via the processor, the at least one phase contrast image of the biological specimen comprising the one or more cells centered around the focal plane for the biological specimen comprises:

receiving, via the processor, a Z-sweep of brightfield images; and generating, via the processor, the at least one phase contrast image based on the Z-sweep of brightfield images.

3. The method of claim 1, wherein the defocusing distance ranges from 20 μm to 60 μm.

4. The method of claim 1, further comprising:

receiving, via the processor, at least one fluorescent image; and calculating, via the processor, a fluorescent intensity of the one or more cells in the biological specimen within the cell-by-cell segmentation mask.

5. The method of claim 1, wherein generating, via the processor, the confluence mask in the form of the binary image based on the at least one phase contrast image comprises:

applying, via the processor, one or more of a local texture filter and a brightness filter to enable identification of pixels belonging to the one or more cells in the biological specimen.

6. The method of claim 1, wherein generating, via the processor, the cell image based on the first brightfield image and the second brightfield image comprises:

enhancing, via the processor, the first brightfield image and the second brightfield image based on a third brightfield image that is centered around the focal plane utilizing at least one of a plurality of pixel-wise mathematical operations or feature detection;

calculating, via the processor, transform parameters;

aligning, via the processor, the first brightfield image and the second brightfield image with the at least one phase contrast image based on the transform parameters; and combining, via the processor, brightness levels for each pixel of the aligned second brightfield image by a brightness level of corresponding pixels in the aligned first brightfield image to thereby form the cell image.

7. The method of claim 1, wherein generating, via the processor, the cell image of the one or more cells in the biological specimen based on the first brightfield image and the second brightfield image further comprises:

receiving, via the processor, one or more user-defined parameters that determine one or more threshold levels and one or more filter sizes; and applying, via the processor, one or more smoothing filters to the cell image based on the one or more user-defined parameters.

8. The method of claim 1, wherein generating, via the processor, the seed mask based on the cell image and the at least one phase contrast image comprises:

modifying, via the processor, the cell image such that each pixel at or above a threshold pixel intensity is identified as a cell seed pixel, thereby resulting in the seed mask having a binary pixelation.

9. The method of claim 1, wherein the seed mask has a plurality of seeds that each correspond to a single cell, the method further comprising:

prior to generating, via the processor, the image of the one or more cells in the biological specimen showing the cell-by-cell segmentation mask, comparing the seed mask and the confluence mask, via the processor, and eliminating one or more regions from the seed mask that are not arranged in an area of the confluence mask and eliminating one or more regions from the confluence mask that do not contain one of the plurality of seeds of the seed mask.

10. The method of claim 1, wherein generating, via the processor, the image of the one or more cells in the biological specimen showing the cell-by-cell segmentation mask based on the seed mask and the confluence mask comprises:

performing, via the processor, a region-growing iteration for each of an active set of seeds; and repeating, via the processor, the region-growing iteration for each seed in the active set of seeds until a growing region for a given seed reaches one or more borders of the confluence mask or overlaps with a growing region of another seed.

11. The method of claim 1, further comprising:

applying, via the processor, one or more filters in response to user input to remove objects based on one or more cell texture metrics and cell shape descriptors; and modifying, via the processor, the image of the biological specimen showing the cell-by-cell segmentation mask in response to application of the one or more filters.

12. The method of claim 1, wherein the one or more cells in the biological specimen are one or more of adherent cells and non-adherent cells.

13. The method of claim 12, wherein the adherent cells comprise one or more of human lung carcinoma cells, fibrocarcinoma cells, breast cancer cells, ovarian cancer cells, or human microvascular cell lines.

14. The method of claim 1, further comprising:

determining, via an optical microscope, the focal plane of the biological specimen.

15. The method of claim 1, further comprising:

determining, via the processor, a cell count for the biological specimen based on the image of the one or more cells in the biological specimen showing the cell-by-cell segmentation mask.

16. A non-transitory computer-readable medium having stored thereon program instructions that upon execution by a processor, cause performance of a set of acts comprising:

the processor generating at least one phase contrast image of a biological specimen comprising one or more cells based on at least one brightfield image centered around a focal plane for the biological specimen;

the processor generating a confluence mask in the form of a binary image based on the at least one phase contrast image;

the processor receiving a first brightfield image of one or more cells in the biological specimen at a defocusing distance above the focal plane and a second brightfield image of the one or more cells in the biological specimen at the defocusing distance below the focal plane;

the processor generating a cell image of the one or more cells based on the first brightfield image and the second brightfield image;

the processor generating a seed mask based on the cell image and the at least one phase contrast image; and the processor generating an image of the one or more cells in the biological specimen showing a cell-by-cell segmentation mask based on the seed mask and the confluence mask.

17. The non-transitory computer-readable medium of claim 16, further comprising:

the processor receiving at least one fluorescent image; and the processor calculating a fluorescent intensity of the one or more cells in the biological specimen within the cell-by-cell segmentation mask.

18. The non-transitory computer-readable medium of claim 16, wherein the processor generating, the seed mask based on the cell image and the at least one phase contrast image comprises:

the processor modifying the cell image such that each pixel at or above a threshold pixel intensity is identified as a cell seed pixel, thereby resulting in the seed mask having a binary pixelation.

19. The non-transitory computer-readable medium of claim 16, wherein the seed mask has a plurality of seeds that each correspond to a single cell, the non-transitory computer-readable medium further comprising:

prior to the processor generating the image of the one or more cells in the biological specimen showing the cell-by-cell segmentation mask, the processor comparing the seed mask and the confluence mask and eliminating one or more regions from the seed mask that are not arranged in an area of the confluence mask and eliminating one or more regions from the confluence mask that do not contain one of the plurality of seeds of the seed mask.

20. The non-transitory computer-readable medium of claim 16, wherein the processor generating the image of the one or more cells in the biological specimen showing the cell-by-cell segmentation mask based on the seed mask and the confluence mask comprises:

the processor performing a region-growing iteration for each of an active set of seeds; and the processor repeating the region-growing iteration for each seed in the active set of seeds until a growing region for a given seed reaches one or more borders of the confluence mask or overlaps with a growing region of another seed.

21. The non-transitory computer-readable medium of claim 16, further comprising:

the processor applying one or more filters in response to user input to remove objects based on one or more cell texture metrics and cell shape descriptors; and the processor modifying the image of the biological specimen showing the cell-by-cell segmentation mask in response to application of the one or more filters.

* * * * *